July 20, 1954
E. R. JACOBI
2,684,269
WHEEL
Filed May 2, 1949
2 Sheets-Sheet 1
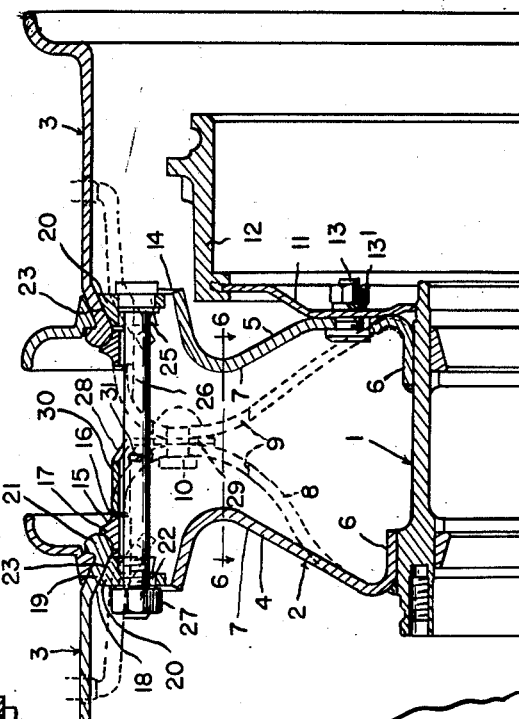
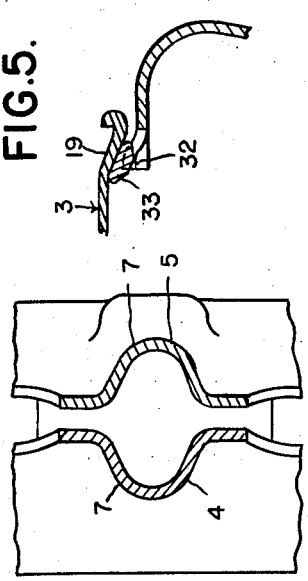
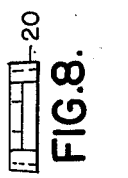
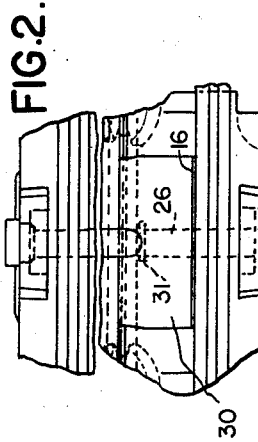
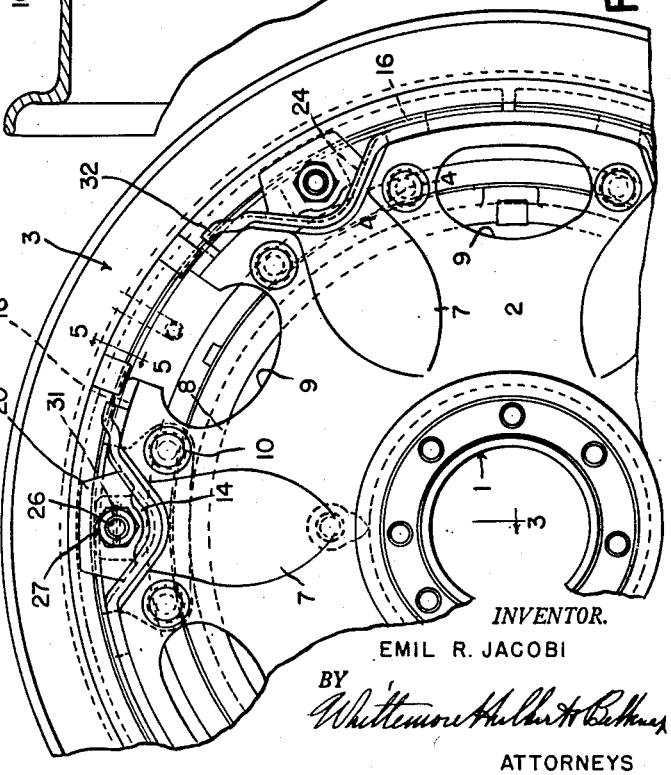
INVENTOR.
EMIL R. JACOBI
BY *Whittemore Hulbert & Belknap*
ATTORNEYS

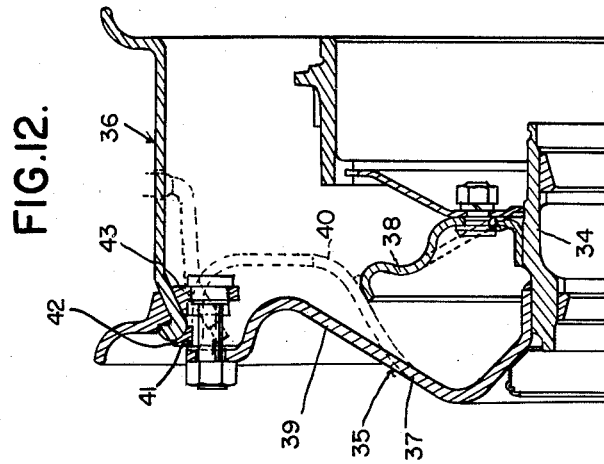
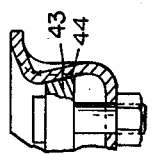
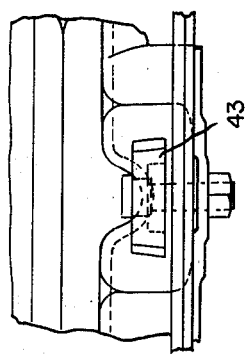
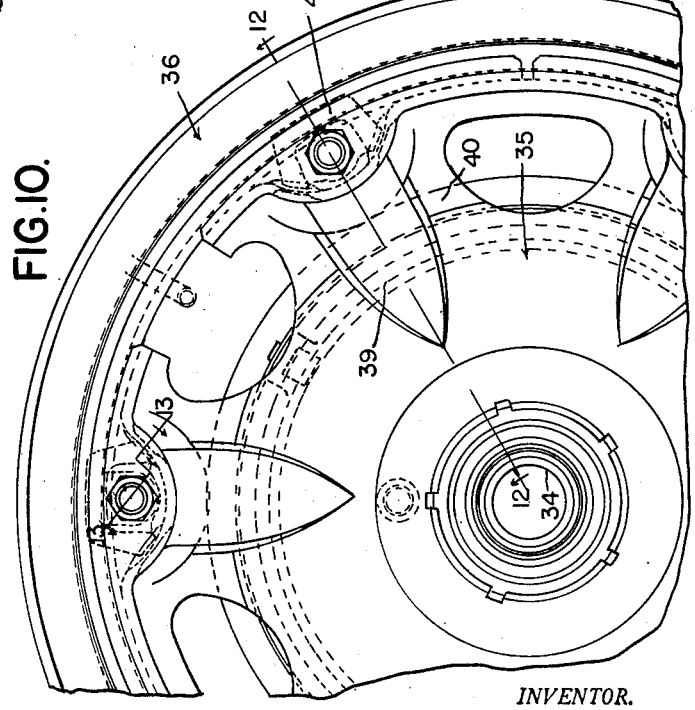
INVENTOR.
EMIL R. JACOBI

Patented July 20, 1954

2,684,269

UNITED STATES PATENT OFFICE 2,684,269

WHEEL

Emil R. Jacobi, Detroit, Mich., assignor to Kelsey-Hayes Wheel Company, Detroit, Mich., a corporation of Delaware Application May 2, 1949, Serial No. 90,865

2 Claims. (Cl. 301—36)

The invention relates to wheels and refers more particularly to motor vehicle wheels.

The invention has for one of its objects to provide an improved construction of wheel which may be economically manufactured.

The invention has for another object to provide an improved construction of wheel comprising a wheel body, a conventional tire carrying rim having an annular frusto-conical radially inner surface portion of standard angle and means for clamping the rim to the wheel body arranged to increase the clamping leverage.

The invention has for still another object to provide an improved construction of clamp for effectively clamping a rim to a wheel body.

The invention has for a further object to provide an improved construction of wheel body for dual tire carrying rims, the wheel body being formed of sheet metal elements.

The invention has for a still further object to provide a simple construction for guiding the bolts which are used in securing the rim clamps in place.

With these and other objects in view the invention resides in the novel features of construction and combinations and arrangements of parts as more fully hereinafter set forth.

In the drawings:

Figure 1 is an outboard elevation of a wheel embodying the invention;

Figure 2 is an edge view of a portion thereof;

Figures 3, 4 and 5 are cross sections on the lines 3—3, 4—4 and 5—5 respectively of Figure 1;

Figure 6 is a cross section on the line 6—6 of Figure 3;

Figures 7, 8 and 9 are respectively an outboard elevation, top plan view and a side elevation of one of the rim clamps;

Figures 10 and 11 are views similar to Figures 1 and 2 respectively showing a modified construction of wheel;

Figures 12 and 13 are cross sections on the lines 12—12 and 13—13 respectively of Figure 10.

As illustrated in Figures 1–6 inclusive, the wheel is a dual rim wheel having the hub 1, the wheel body 2, and the pair of tire carrying rims 3. The wheel body is formed of the outboard and inboard sheet metal wheel body elements 4 and 5 respectively in the nature of stampings, each wheel body element having the central laterally inturned flange 6 encircling and fixedly secured to the hub 1 in axially spaced relation as by being welded to the hub. The wheel body elements are formed with the angularly spaced radial spoke portions 7 and the intermediate axially depressed portions 8, the latter being provided with the hand holes 9 and being secured together by the rivets 10 between the hand holes and the spoke portions. The radially inner parts of the spoke portions of inboard wheel body element are formed to extend radially and provide an extended bearing for the web 11 of the brake drum 12. The brake drum is secured to the wheel body by means of the bolts 13 and the nuts 13'.

The radially outer portions of the outboard and inboard wheel body elements are alike, each having angularly spaced radially inward depressions or recesses 14 at its periphery in substantially axial alignment with the depressions or recesses of the other wheel body element. The spoke portions and the axially depressed portions terminate in a laterally outwardly turned periphery formed with the depressions or recesses at the radially outer ends of the spoke portions and having planar wall portions which converge radially inwardly toward each other and are connected by arcuate portions. The periphery of each wheel body element between the spoke portions is on the same radius and is adapted to be encircled by the aligning ring 15 which is transversely split at one point. Each wheel body element is formed with the angularly spaced radially outwardly struck tongues 16 at the sides of the recesses and presenting shoulders in the same plane of rotation of the wheel for engagement by the base of the aligning ring. It will be noted that each aligning ring has the central flange 17 extending generally radially outwardly from the middle of the base, the sides of this flange being connected to the base by arcs.

Each of the rims 3 is a conventional rim having a gutter at one edge of the base for detachably receiving a tire retaining ring, the radially inner surface 18 of the wall 19 forming a portion of the gutter being frusto-conical and being engageable by the clamps 20 which force the flange 21 forming another portion of the wall of the gutter against the radially outer portion of the flange 17 of the associated aligning ring. The frusto-conical radially inner surface portion has a standard angle of inclination to the axis of the rim. Each clamp 20 has a body which is formed with the bolt hole 22 therethrough and with the bearing surface 23 at the radially outer end inclined to the axis of the bolt hole at the same angle of inclination as the radially inner surface 18 of the rim. The body of each clamp is also formed with the angularly spaced planar bearing surfaces 24 which are at the side of the bolt hole opposite the bearing surface 23 and converge radially inwardly with respect to each other at the same angle of radially inward convergence as the bearings 25 engaged by the clamp and formed by the wall portions of the associated recess. For the purpose of increasing the action of each clamp upon the rim moving the latter against the aligning ring, each of the angularly spaced bearing surfaces 24 of each clamp is inclined to the axis of the hole 22 in the same general direction as the bearing surface 23 but at a smaller angle and the bearings 25 formed by the wall portions of each recess are inclined to the axis of the wheel body at the same angle as the bearing surfaces 24. In the present instance the angle of the surface 18 and bearing surface 23 is 28° while the angle of each of the bearing surfaces 24 and the bearings 25 is approximately 11° so that as a result the net clamp angle is reduced to approximately 17° so that the rim may be more securely and positively clamped in place.

26 are bolts extending substantially axially through the aligned depressions or recesses at the peripheries of the wheel body elements, each bolt being preferably secured permanently to its inboard clamp by being staked thereto and each bolt being threadedly engaged at its outboard end by the nut 27. For positioning the bolts and preventing their accidental disengagement from the wheel body and at the same time allowing the necessary axial movement of the bolts in an inboard direction to remove the inboard aligning ring and the inboard tire carrying rim, I have provided the plate means 28 comprising angle shaped plates each having a radial flange 29 extending between the axial depressions 8 and secured in place by the rivets 10. Each plate also has the lateral flange 30 which extends in an outboard direction circumferentially between the struck out tongues 16 and radially outwardly of the spoke portions 7. Each plate is formed with an opening mainly in its radial portion 28 of a size to provide for the free passage therethrough of the associated bolt 26. 31 is a transverse member such as a cotter pin extending through the bolt at the outboard side of the radial portion 28 of each plate and adapted to engage this radial portion to limit the inboard movement of the bolt after it has been moved in an inboard direction a sufficient distance to provide for uncovering the inboard aligning ring so that it may be removed.

To drive each rim, the outer periphery of each wheel body element at adjacent sides of adjacent radial depressions or recesses is formed with the radially outwardly struck-out tongues 32 and each rim has secured to its inclined gutter wall 19 the peripherally or angularly spaced lugs 33 which are positioned between the tongues 32 and either of which is adapted to engage its associated tongue to limit peripheral or creeping movement of the rim on the wheel body element.

Figures 10 to 13 inclusive illustrate a modified construction of wheel which has a single tire carrying rim of the same conventional construction as the rim of Figures 1–6 inclusive. This wheel as shown comprises the hub 34, the wheel body 35 and the rim 36. The wheel body is formed of the wheel body element 37 and the bracing ring 38 having inturned cylindrical flanges extending toward each other and encircling and fixedly secured to the hub as by being welded thereto. The wheel body element 37 has the angularly spaced radial spoke portions 39 and the axial depressions 40 intermediate the spoke portions, the latter being secured to a peripheral flange of the bracing ring 38 as by being welded thereto. The spoke portions are formed at their radially outer ends with radially inward depressions or recesses, the outboard ends of which however are closed by the radially outer end portions of the spoke portions. The periphery of the wheel body element between the spoke portions and more especially between the recesses is formed with a radius less than that of the spoke portions so that the radially outer ends of the spoke portions provide the shoulders 41 facing in an inboard direction for abutting the transversely split aligning ring 42 seated on the periphery of the wheel body element. The aligning ring is formed with an arcuate face for engaging the radially extending flange of the gutter of the rim 36. For clamping the flange against the aligning ring there is the clamp 43 of the same construction and operating in the same manner as the clamp 20. With this construction, the bearings 44 formed by the planar wall portions of the radial depressions or recesses are inclined in an outboard direction toward the axis of the wheel body and in generally the same direction as the inclined or frusto-conical wall of the gutter of the rim but at a smaller angle to thereby increase the clamping action upon the rim.

What I claim as my invention is:

1. A wheel comprising a sheet metal wheel body element having angularly spaced peripheral radially inward depressions, a rim having an annular frusto-conical radially inner surface portion and clamps securing said rim to said wheel body element, each of said clamps having a bearing surface inclined to the axis of said wheel body element at substantially the same angle as and engaging said radially inner surface portion of said rim and a second bearing surface inclined to the axis of said wheel body element in the same general direction as and at a smaller angle than said first mentioned bearing surface, each of said depressions having a generally radially outwardly facing surface inclined to the axis of said wheel body element at substantially the same angle as and engaging said second mentioned bearing surface.

2. A wheel comprising a hub, a pair of sheet metal wheel body elements secured to said hub in axially spaced apart relation, each of said wheel body elements having a laterally outwardly turned portion provided with angularly spaced peripheral radially inward depressions in substantially axial alignment with corresponding depressions of the other wheel body element, said laterally outwardly turned portions extending away from each other, each of said wheel body elements also having intermediate axially depressed portions secured together, clamps slidably engaging said radially inward depressions for securing rim elements on said wheel body elements, means comprising bolts for moving said clamps toward each other and plate means secured between said axially depressed portions of said wheel body elements guiding said bolts.

References Cited in the file of this patent

UNITED STATES PATENTS

| Number | Name | Date |
| --- | --- | --- |
| 1,189,446 | Harbridge | July 4, 1916 |
| 1,601,455 | Rubsam | Sept. 28, 1926 |
| 1,617,999 | Forsyth | Feb. 15, 1927 |
| 1,665,830 | Hale | Apr. 10, 1928 |
| 1,733,727 | Forsyth | Oct. 29, 1929 |
| 1,901,629 | Burger | Mar. 14, 1933 |
| 1,948,320 | Swain | Feb. 20, 1934 |
| 2,048,177 | Burger II | July 21, 1936 |

FOREIGN PATENTS

| Number | Country | Date |
| --- | --- | --- |
| 560,623 | France | 1923 |